(12) United States Patent
Tachikura et al.

(10) Patent No.: US 8,472,769 B2
(45) Date of Patent: Jun. 25, 2013

(54) OPTICAL FIBER, END PART PROCESSING METHOD OF OPTICAL FIBER, AND END PART PROCESSING APPARATUS OF OPTICAL FIBER

(75) Inventors: Masao Tachikura, Hitachi (JP);
Kazumasa Ohsono, Hitachi (JP);
Noribumi Shiina, Hitachi (JP); Kanako Suzuki, Hitachi (JP); Yoshikazu Namekawa, Hitachi (JP); Kyoji Osozawa, Hitachi (JP); Toshihiko Ishikawa, Hitachi (JP); Masaru Ishikawa, Hitachi (JP); Motoyoshi Nakamura, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 276 days.

(21) Appl. No.: 12/941,231

(22) Filed: Nov. 8, 2010

(65) Prior Publication Data

US 2011/0110637 A1 May 12, 2011

(30) Foreign Application Priority Data

Nov. 9, 2009 (JP) .................................. 2009-255847

(51) Int. Cl.
*G02B 6/032* (2006.01)

(52) U.S. Cl.
USPC ............................ 385/125; 385/122; 385/123

(58) Field of Classification Search
USPC .. 385/125, 96, 122, 123; 118/620; 427/163.2; 264/1.25; 65/393
See application file for complete search history.

(56) References Cited

U.S. PATENT DOCUMENTS

| | | | | | |
|---|---|---|---|---|---|
| 3,516,239 | A | * | 6/1970 | Fukuda et al. | ................ 442/193 |
| 3,990,874 | A | * | 11/1976 | Schulman | ........................ 65/393 |
| 4,127,398 | A | * | 11/1978 | Singer, Jr. | ........................ 65/393 |
| 5,155,792 | A | * | 10/1992 | Vali et al. | ...................... 385/125 |
| 6,868,213 | B2 | | 3/2005 | Sasaoka et al. | |
| 6,954,574 | B1 | * | 10/2005 | Russell et al. | ................ 385/125 |

FOREIGN PATENT DOCUMENTS

| | | |
|---|---|---|
| JP | 2212338 | 8/1990 |
| JP | 2002-323625 | 11/2002 |

(Continued)

OTHER PUBLICATIONS

"Recent Advances in Photonic Crystal Fibers and Holey Fiber" by T. Hasegawa in Monthly Optronics, No. 7, (pp. 203-208) 2001.

*Primary Examiner* — Ellen Kim
(74) *Attorney, Agent, or Firm* — Brundidge & Stanger, P.C.

(57) ABSTRACT

An optical fiber that has no bubbles in the ultraviolet ray curable resin filled inside the air holes to seal the end parts thereof, an end part processing method of the optical fiber, and an end part processing apparatus of the optical fiber, are provided. In an end part processing method of an optical fiber that is comprised of a core and a cladding formed around the core, the cladding having a refraction index lower than that of the core and has a plurality of air holes formed therein along the axis of the core, wherein the end part process of the optical fiber is to form sealed portions on the ends of the air holes by sealing them with ultraviolet ray curable resin, the method is characterized in that the sealed portion is formed by heating the end of the optical fiber.

15 Claims, 10 Drawing Sheets

U.S. PATENT DOCUMENTS

| | | |
|---|---|---|
| 2004/0146596 A1* | 7/2004 | Shibata et al. ............... 425/116 |
| 2006/0062533 A1 | 3/2006 | Hachiwaka et al. |
| 2006/0204195 A1* | 9/2006 | Kurosawa et al. ........... 385/125 |
| 2008/0292244 A1 | 11/2008 | Kato et al. |
| 2011/0142402 A1* | 6/2011 | Tachikura et al. ............. 385/96 |

FOREIGN PATENT DOCUMENTS

| | | |
|---|---|---|
| JP | 2004-004320 | 1/2004 |
| JP | 2006178101 | 7/2006 |
| JP | 2008287191 | 11/2008 |

* cited by examiner $$\sin \theta = \frac{n_2}{n_1}$$

$n_1 > n_2$ $$\sin \alpha = \frac{n_1}{n_2}$$

$n_1 < n_2$

OPTICAL FIBER, END PART PROCESSING METHOD OF OPTICAL FIBER, AND END PART PROCESSING APPARATUS OF OPTICAL FIBER

TECHNICAL FIELD

The present invention relates to an optical fiber, an end part processing method of the optical fiber and an end part processing apparatus of the optical fiber. The invention relates particularly to a holey fiber, which is under study for application to optical fiber cords for communication purpose and optical devices; an end part processing method of the holey fiber; and an end part processing apparatus of the holey fiber.

BACKGROUND ART

In recent years, optical fibers of new configurations called holey fibers or photonic crystal fibers have been becoming a focus of attention (see Non Patent Literature 1, for example). A typical configuration of a holey fiber is illustrated in FIG. 13. As illustrated in FIG. 13, a holey fiber 103 is comprised of a core 131 and a cladding 132 formed around the core 131, wherein the cladding 132 has a plurality of air holes 133 that extends longitudinally along the axis of the core 131.

The air hole 133 in the cladding 132 of the holey fiber 103 allows ingress of water thereinto or invites occurrence of condensation therein due to temperature variation if the air hole 133 is open to the outside at the fiber end. These disadvantages will possibly cause lowering mechanical strength or variation in optical properties.

In splicing optical fibers using such as a mechanical splice and an MT connector, such splicing practice fills the gap between the end faces of optical fibers to be spliced together (splicing end faces) with a refractive index matching liquid to reduce reflection and loss at the splice. Where the optical fiber to be spliced is a holey fiber like the one illustrated in FIG. 13 however, the refractive index matching liquid will flow into inside of the air holes from the end face of the splice. This behavior invites an anxiety about causing a large reflection or splice loss at the splicing end face. Further, an optical connector for mono-fiber splicing, which needs no refractive index matching liquid, has problems in that the polishing operation applied on the splicing end face causes polishing agent and polishing chips to enter the air hole inviting degradation of optical properties and appear at a later stage on the splicing interface disturbing light propagation.

JP 2004-4320 A discloses a method that deals with this problem. The method is to seal the end of the air hole of a holey fiber with a sealing material having a refractive index lower than that of the core of the fiber.

JP 2002-323625 A discloses other different methods to seal the air holes of the holey fiber. The methods include: collapsing the air holes by heating around the cladding at the part a little distant from the splicing face; closing air holes by heating the splicing face with a fusion splicer (a splicing device for splicing optical fibers by heat-fusion with atmospheric discharge); blocking the air holes by filling the holes with curable resin such as ultraviolet ray curable resin and heat curable resin; and sealing the air hole by covering the end thereof with metallic thin film.

The method of closing the air holes by collapsing the air holes by heating around the cladding as disclosed in JP 2002-323625 A is advantageous compared to the method of blocking the air holes by filling the holes with a curable resin in that there is no anxiety about aged deterioration and that polishing the end face is easy. This method however has a problem in that collapsed portion needs cutting operation to make the portion to be the splicing face because the collapse-fused portion is local.

As a method of sealing the air holes by fusing the holey fiber itself, it would be feasible to splice an optical fiber of ordinary structure to the holey fiber. This method however tends to cause axial or angular deviation or bulge at the splicing point. The occurrence of these deviations or bulge at the splicing point brings problems in workability or reliability of the splice in that the holey fiber will encounter inexpediency in inserting into a ferrule and that such inexpedient situation will easily result in damage on the holey fiber surface. Further, this method has another disadvantage in that the splice as a whole will involve unavoidable additional splice loss caused by splicing an optical fiber of ordinary structure to the holey fiber.

Therefore, it is the most suitable and practical method to block using curable resin for sealing the air holes of the holey fiber. In particular, the ultraviolet ray curable resin is considered to be the optimal material from viewpoints:

(1) Viscosity before being cured is low, which makes filling into air holes easy;

(2) Irradiation of ultraviolet light cures the resin in a short time; and (3) The resin is a field-proven material as an adhesive for optical use.

{Non Patent Literature 1} HASEGAWA Takemi: "Recent advances in photonic crystal fibers and holey fibers" *Monthly OPTRONICS* No. 7 (2001) pp. 203-208; The Optronics Co., Ltd.

SUMMARY OF INVENTION

In a conventional method, after the air hole of a holey fiber is filled with ultraviolet ray curable resin, ultraviolet light irradiation is applied in a simple manner to cure the filled resin. This method however has a problem of bubble creation inside the ultraviolet ray curable resin after its curing. This comes from the fact that the shrinkage of the ultraviolet ray curable resin occurring inside the air holes during its curing is being constrained.

Bubble thus appeared causes a local unevenness of the refractive index in such a portion of the air hole as is sealed by the ultraviolet ray curable resin (sealed portion). Further, there is another problem such that the bubble appeared in the ultraviolet ray curable resin will increase the splice loss as temperature of the usage environment varies where the refractive index of the ultraviolet ray curable resin is close to that of the cladding within the extent lower than the refractive index of the cladding. The increase in splice loss occurs, for example, because of reversal of the refractive index, i.e., the refractive index of the sealed portion becomes higher than that of the cladding, occurred locally in the sealed portion since the refractive index of the ultraviolet ray curable resin becomes large as temperature of the usage environment drops.

When the end face of a holey fiber having a bubble-involving sealed portion sealed with ultraviolet ray curable resin undergoes end polishing with a ferrule for splicing to other optical fiber installed on the end part of such holey fiber, the bubble-involving portion can sometimes appear on the end face of the ferrule producing a pit on the end face of the sealed portion. Polishing chips or soil caught in the pit damages or defiles the end face of the holey fiber with insertion-extraction of the connector, bringing anxiety of making the splice loss increased or the transmission properties degraded.

Meanwhile, an attempt to polish the end face avoiding the producing of the pit incurs a problem of increased manufacturing cost since such attempt lowers the yield in the polishing process.

In consideration of these problems, the present invention aims at providing an optical fiber that has no bubbles in the ultraviolet ray curable resin filled inside the air holes to seal the end parts thereof, an end part processing method of the optical fiber, and an end part processing apparatus of the optical fiber.

MEANS FOR SOLVING THE PROBLEMS

To solve above-stated problems, the present invention provides an end part processing method of an optical fiber that is comprised of a core and a cladding formed around the core, the cladding having a refractive index lower than that of the core and a plurality of air holes formed therein along the axis of the core, wherein the end part process of the optical fiber is to form sealed portions on the end parts of the air holes by sealing them with ultraviolet ray curable resin, the method characterized in that the sealed portion is formed by heating the end part of the optical fiber.

To attain above-stated aim, the present invention provides an end part processing method of an optical fiber that is comprised of a core and a cladding formed around the core, the cladding having a refractive index lower than that of the core and a plurality of air holes formed therein along the axis of the core, wherein the end part process of the optical fiber is to form sealed portions on the end parts of the air holes by sealing them with ultraviolet ray curable resin, the method comprising the steps of:

filling the end parts of the air holes of the optical fiber with the ultraviolet ray curable resin;

arranging the end part of the optical fiber filled with the ultraviolet ray curable resin on an end part processing member, which is equipped in an end part processing unit, in such a manner that the end part of the optical fiber does not touch the end part processing member, wherein the end part processing member has ultraviolet light reflecting nature; and curing the ultraviolet ray curable resin filled inside the end parts of the air holes to form the sealed portion by irradiating the end part of the optical fiber with ultraviolet light emitted from an irradiator provided in the position opposite to the end part processing member across the arrangement of the end part of optical fiber, wherein the end part of the optical fiber is irradiated with ultraviolet light emitted from the irradiator and with the reflection of the emitted ultraviolet light reflected off the end part processing member with the end part of the optical fiber heated by the end part processing member that is made to generate heat by the ultraviolet light penetrated the end part of the optical fiber.

The present invention includes, for attaining above-stated aim, such improvement or modification as will appear in the following description in terms of the end part processing method of an optical fiber defined above.

(1) The end part processing member irradiates the end part of the air hole with a diffuse reflection of the emitted ultraviolet light reflected off a scattering surface formed on the face thereof on which the end part of the optical fiber is to be arranged.

(2) The end part processing member is comprised of a glass plate and a metal coating provided on the other face of the glass plate opposite to the face thereof on which the optical fiber is to be arranged, wherein the end part of the optical fiber is heated by the glass plate that is made to generate heat by the heat transferred from the metal coating that is made to generate heat by absorbing the ultraviolet light penetrated the glass plate.

(3) The end part processing member is comprised of a metal plate, wherein the end part of the optical fiber is heated by the metal plate that is made to generate heat by absorbing ultraviolet light penetrated the end part of the optical fiber.

(4) The end part of the optical fiber is arranged on the end part processing member so that the distance from the surface of the end part processing member to the center of the optical fiber will be within 1 mm.

To attain above-stated aim, the present invention provides an end part processing apparatus of an optical fiber that is comprised of a core and a cladding formed around the core, the cladding having a refractive index lower than that of the core and a plurality of air holes formed therein along the axis of the core, wherein the end part process of an optical fiber is to form sealed portions on the end parts of the air holes by sealing them with ultraviolet ray curable resin, the apparatus comprising an ultraviolet light irradiation unit having an irradiator that irradiates the end part of the optical fiber with ultraviolet light, and an end part processing unit, on which the end part of the optical fiber is arranged being made to face the irradiator, provided in a position opposite to the irradiator across the end part of the optical fiber to process the end part of the optical fiber so arranged thereon with ultraviolet light from the irradiator, wherein the end part processing unit having the end part of the optical fiber arranged thereon is comprised of an end part processing member that processes the end part of the optical fiber in a manner comprised of the steps of generating heat by ultraviolet light emitted from the irradiator and penetrated the end part of the optical fiber, heating the end part of the optical fiber thereby, and reflecting part of the ultraviolet light from the irradiator to irradiate the end part of the optical fiber with such reflection.

The present invention includes, for attaining above-stated aim, such improvement or modification as will appear in the following description in terms of the end part processing apparatus of the optical fiber defined above.

(1) The end part processing member has a scattering surface on the face thereof on which face the end part of the optical fiber is to be arranged, wherein the scattering surface makes diffuse reflection of the ultraviolet light penetrated the end part of the optical fiber to irradiate the end part of the air hole with the reflection.

(2) The end part processing member is comprised of a glass plate or a metal plate.

(3) The glass plate has a metal coating on the other face thereof opposite to the face on which the optical fiber is arranged, wherein the metal coating absorbs part of ultraviolet light penetrated the glass plate, generates heat to heat the glass plate, and reflects ultraviolet light penetrated the glass plate.

(4) The end part processing apparatus of an optical fiber is further comprised of a height adjusting table that regulates the distance between the end part processing unit and the irradiator by moving the end part processing unit vertically.

To attain above-stated aim, the present invention provides an optical fiber comprising a core and a cladding formed around the core, the cladding having a refractive index lower than that of the core and a plurality of air holes formed therein along the axis of the core, wherein end parts of the air holes have sealed portions formed by curing ultraviolet ray curable resin filled inside the end parts of the air holes by irradiation of ultraviolet light and its reflection with the end parts of the air holes being heated.

The present invention is capable of providing an optical fiber having no bubbles inside the ultraviolet ray curable resin that seals the end part of the air hole, an end part processing method of the optical fiber, and an end part processing apparatus of the optical fiber.

BRIEF DESCRIPTION OF DRAWINGS

FIG. 6 is an electron micrograph that shows the cross section of a sealed portion formed by sealing the end portion of the air hole of a holey fiber with ultraviolet ray curable resin.

DESCRIPTION OF EMBODIMENTS

Figure 1:
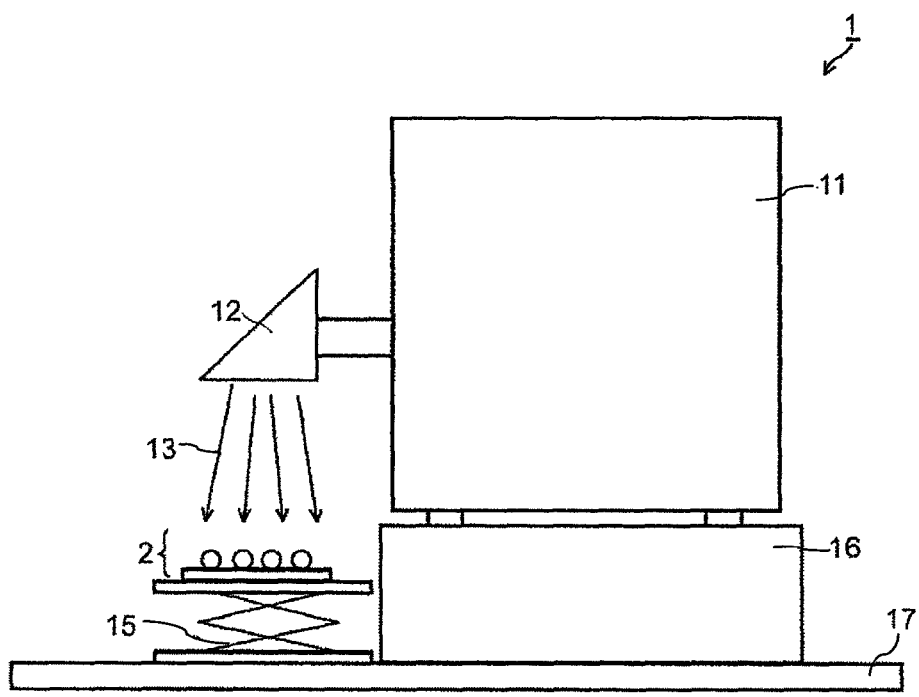
FIG. 1 illustrates an end part processing apparatus of optical fibers pertinent to an embodiment of the present invention.

Hereunder, an embodiment of the present invention will be explained referring to figures.
[Configuration of Apparatus for End Treatment of Optical Fibers]
(1) Overall Arrangement FIG. 1 illustrates an end part processing apparatus of optical fibers pertinent to an embodiment of the present invention.

An end part processing device 1 illustrated in FIG. 1 is comprised of an ultraviolet light irradiation unit (a UV irradiation unit) 11;

a mounting base 16 for fixing the ultraviolet light irradiation unit 11 thereon, wherein the mounting base 16 is arranged under the ultraviolet light irradiation unit 11;

an irradiator (downward irradiation lens unit) 12 arranged on one lateral side of the ultraviolet light irradiation unit 11 for emitting ultraviolet light (ultraviolet ray) delivered from the ultraviolet light irradiation unit 11 toward outside;

an end part working unit 2 arranged under and facing the irradiator 12 for working the end part of an optical fiber (a holey fiber), which is arranged so as to face the irradiator 12, with ultraviolet light emitted from the irradiator 12; and a height adjustable table 15 for placing the end treatment unit 2 thereon and for adjusting the operational height thereof.

The mounting base 16 is provided on a base structure 17 such as a table. On the mounting base 16, the ultraviolet light irradiation unit 11 is mounted. On one lateral side of the ultraviolet light irradiation unit 11, the irradiator (downward irradiation lens unit) 12 is installed projecting from that lateral side. The ultraviolet light irradiation unit 11 produces ultraviolet lights, which is emitted downward (downward irradiation) from the bottom of the irradiator 12 to the end treatment unit 2 arranged under the irradiator 12 as an ultraviolet light (ultraviolet rays) 13.

On the base structure 17 on which the mounting base 16 is provided, the height adjustable table 15 is arranged in a position close to the mounting base 16 and under the irradiator 12. On the height adjustable table 15, the end part processing unit 2 including optical fibers is arranged. Adjusting elevation of the height adjustable table 15 regulates the distance between the end part processing unit 2 provided on the height adjusting table 15 and the irradiator 12 to a proper interspace.

With this configuration, the end part processing unit 2 is irradiated with the ultraviolet light 13 radiated from the irradiator 12 installed on the ultraviolet light irradiation unit 11. The irradiator 12 is provided facing the end part processing unit 2 across an end part of optical fiber arranged on an end part processing member (which will be described later) of the end part processing unit 2 and emits the ultraviolet light 13 to irradiate the end part of the optical fiber arranged on the end part processing unit 2.

Figure 2A:
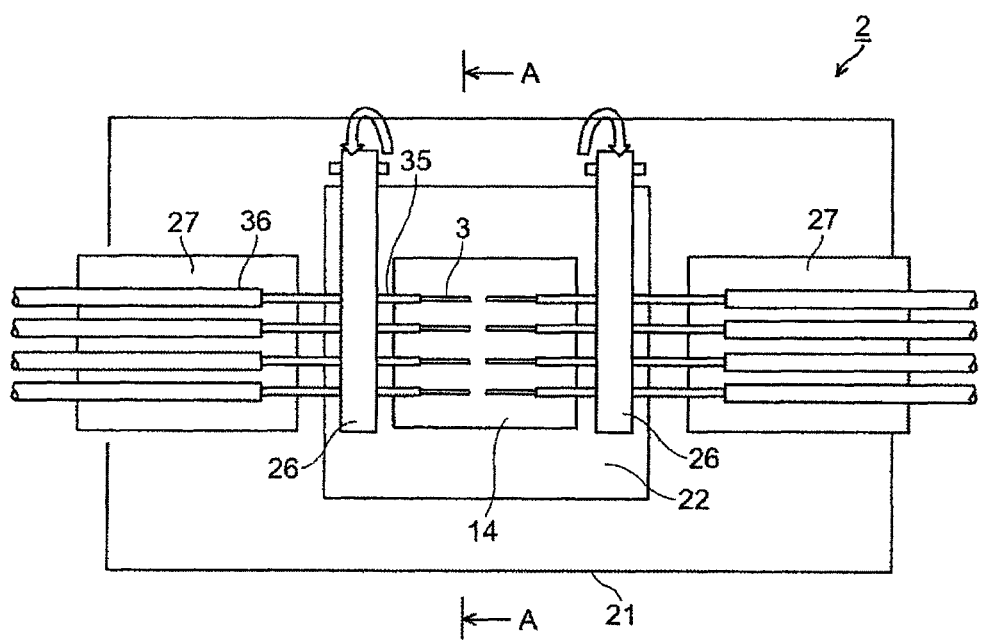
FIG. 2 illustrates an end part processing unit pertinent to an embodiment of the present invention.
Figure 2B:
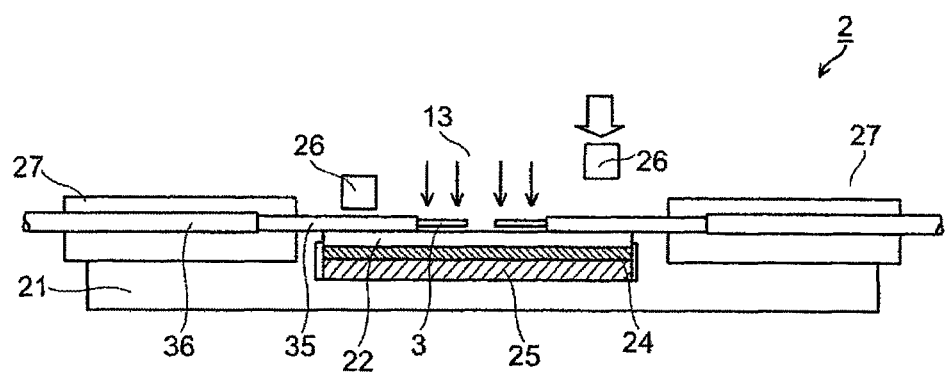

In this embodiment, moving vertically the height adjustable table 15 makes it possible to vary the extent of the irradiation area (an ultraviolet light irradiated area) of the ultraviolet light 13 that is radiated over the end part processing unit 2. Further, moving the height adjustable table 15 up or down makes it possible to control the degree of irradiation (lighting intensity) of the ultraviolet light 13 to the optical fiber. As the irradiator (the downward irradiation lens unit) 12, it may be feasible to employ such an irradiator (the downward irradiation lens unit) 12 having a built-in diaphragm that permits varying the extent of the irradiation area of the ultraviolet light 13. Determination of the irradiation area of the ultraviolet light 13 by using this style of irradiator (the downward irradiation lens unit) 12 having a diaphragm function and setup of the lighting intensity by using the height adjustable table 15 make it possible to separately control the extent of the irradiation area and the lighting intensity.
(2) Configuration of End Treatment Unit FIG. 2 illustrates an end part processing unit to be provided in the end part processing device of optical fibers pertinent to the embodiment of the present invention. FIG. 2A is a plan view of the end treatment unit viewed from the top. FIG. 2B is a side view of the end part processing unit.

An end part processing unit 2 illustrated in FIG. 2 is comprised of at least a supporting base 21; a glass plate (end treatment member) 22 having a metal coating 24, the glass plate 22 arranged on the supporting base 21; a seating (seating member) 25 on which the glass plate 22 is placed; an optical fiber clamp 26 that holds an optical fiber arranged on the glass plate 22 by a fiber jacket 35 of the optical fiber; and a cord holder 27 that holds an optical fiber cord by a cord sheath 36 of the optical fiber.

As illustrated in FIG. 2B, the glass plate 22 and the seating 25 are arranged in a recess (alcove) formed in the center of the supporting base 21 in such a manner that the glass plate 22 is stacked on the seating 25. In this embodiment, the glass plate 22 is made of quartz glass for example. The cord holders 27-27 are arranged symmetrically on both fringe sides of the glass plate 22 stacked on the seating 25 and accommodated in the recess formed on the supporting base 21. The optical fiber clamps 26-26 are provided on both edge-sides of the glass plate 22 symmetrically with respect to the center of the glass plate 22.

On the end part processing unit 2, a plurality of holey fibers 3 are placed as the optical fibers to be end-processed. Holey fibers 3 may be arranged on the end part processing unit 2 in a manner, for example, positioning a non jacket end of the holey fiber 3 in approximate center of the glass plate 22 and placing such a portion of the holey fiber 3 as is covered with the fiber jacket 35 (a jacketed optical fiber) on the edge-side of the glass plate 22. Such a portion of the jacketed optical fiber as is arranged on the edge-side of the glass plate 22 is secured with the optical fiber clamp 26. Such a portion of the jacketed optical fiber as is arranged extending outward beyond the edge-side of the glass plate 22 and such a portion of the jacketed optical fiber as is covered with a cord sheath 36 to form an optical fiber cord are fixed on the cord holder 27. Thus, in this embodiment, eight holey fibers 3 in total are placed on the glass plate 22, in the above-stated arranging manner, wherein four fibers are placed on one side of the glass plate 22 and another four fibers on the other side thereof symmetrically with respect to the center of the glass plate 22 stacked in the center of the end treatment unit 2. Embodiments of the invention are however not limited to this mode.

The holey fiber 3 is usually used in a form of an optical fiber cord with a covering given thereon. The covering of the holey fiber 3 is comprised of the fiber jacket 35 formed over the holey fiber 3 and the cord sheath 36 formed over the fiber jacket 35.

In this embodiment, the cord sheath 36 is removed over a predetermined length. The fiber jacket 35 exposed by removal of the cord sheath 36 is also removed over a predetermined length.

Air holes on the exposed ends of the holey fibers 3 underwent removal of their fiber jacket 35 are filled with ultraviolet ray curable resin. The holey fibers 3 thus prepared are arranged in an array on the glass plate 22 so that the end parts of fibers are positioned in the center of the glass plate 22. The array of the holey fibers 3 is positioned by the cord holders 27-27 provided on both fringe sides of the glass plate 22 and cord sheaths 36 are held by the cord holders 27-27. The fiber jackets 35 are secured on the face of the glass plate 22 with the fiber clamps 26-26. With this manner, the holey fibers 3 are mounted on the end part processing unit 2.

The end part processing unit 2 is provided in such a manner that the bottom face of the supporting base 21 illustrated in FIG. 2B touches the top face of the height adjustable table 15 illustrated in FIG. 1. The approximate center of the end part processing unit 2 provided on the height adjustable table 15 is irradiated with an ultraviolet light 13 emitted from the irradiator 12 provided above the end part processing unit 2 as illustrated in FIG. 1. Thereby, an irradiation area (ultraviolet light irradiation area) 14 having a uniform distribution of irradiation intensity of the ultraviolet light 13 covering the holey fibers 3 arrayed in approximate center of the glass plate 22 is created.

Function in Embodiment

Figure 3A:
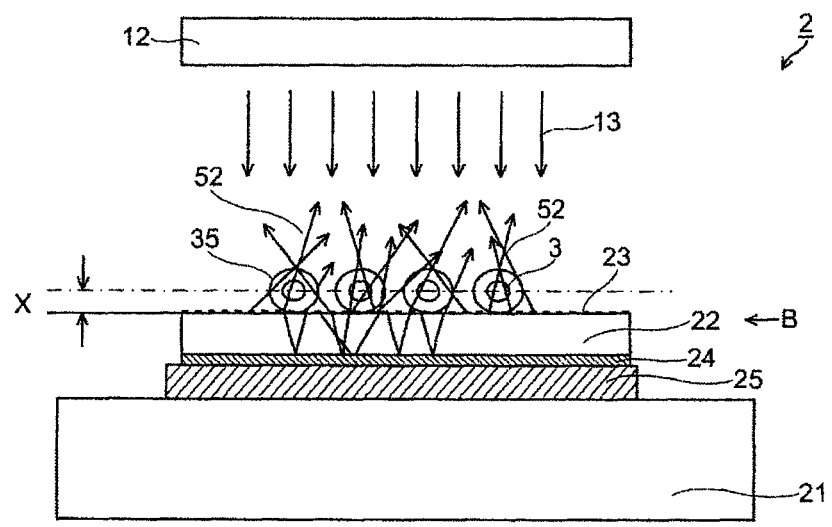
FIG. 3A is a sectional view sectioned along A-A direction illustrated in FIG. 2A
Figure 3B:
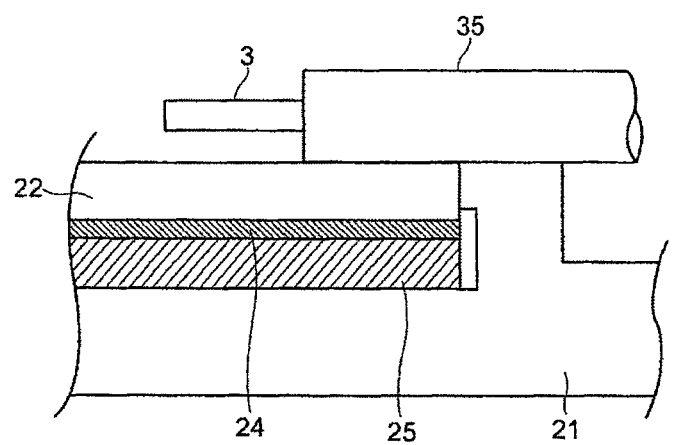
FIG. 3B is an enlarged sectional side view around the end part of a holey fiber viewed in the direction of B illustrated in FIG. 3A.

A sectional view of the end part processing unit 2 in this embodiment of the present invention is illustrated in FIG. 3. The sectional view illustrated in FIG. 3A is a view sectioned along A-A in FIG. 2A, and FIG. 3B is an enlarged sectional view of the end part of the holey fiber and its vicinity viewed from the point B indicated in FIG. 3A. Explanation of function in this embodiment follows referring to the sectional view illustrated in FIG. 3.

As illustrated in FIG. 2, the configuration of the end part working unit 2 in this embodiment is such that the glass plate 22 and the seating 25 are stacked and arranged on the supporting base 21. More in details, the top face of the glass plate 22 (the face on which the ends of the holey fibers 3 are arranged) is formed as a scattering surface 23 having a roughened surface like a frosted glass. On the bottom face of the glass plate 22 (a surface opposite to the scattering surface 23), the metal coating 24 of such as aluminum is provided. The metal coating 24 can be formed on the glass plate 22 easily by vapor deposition or similar processing.

As illustrated in FIG. 3B, a plurality of holey fibers 3 of which air holes are filled with ultraviolet ray curable resin are arranged above the glass plate 22 but close to a maximum extent before touching. From above the end part processing unit 2, the ultraviolet light 13 irradiates the area approximate center thereof covering the holey fibers 3.

Part of the ultraviolet light 13 emitted toward the end part processing unit 2 irradiates directly the end parts of the holey fibers 3; other part of the ultraviolet light 13 that does not directly irradiate the end parts of the holey fibers 3 strikes the top face of the glass plate 22 under the holey fibers 3. Such a part of ultraviolet light 13 as directly irradiates the holey fibers 3 partially passes through the end parts of the holey fibers 3 to strike the top face of the glass plate 22 under the holey fibers 3.

Since the top face of the glass plate 22 is formed as a scattering surface 23 having a frosted-glass-like surface, part of the ultraviolet light 13 striking the top face of the glass plate 22 is reflected diffusedly. This reflection enters again the end parts of the holey fibers 3 as a reflection 52 emitted in the direction from the glass plate 22 to the irradiator 12. Such a part of the ultraviolet light 13 striking the top face of the glass plate 22 as is not diffusely-reflected thereat is deflected diffusively at the top face thereof and penetrates into the glass plate 22 to reach the metal coating 24 under the glass plate 22. The ultraviolet light 13 penetrated into the glass plate 22 is reflected at the surface of the metal coating 24. Part of this reflection is again reflected downward (to the metal coating 24) at the top face of the glass plate 22 and the rest is emitted from the top face of the glass plate 22 to the end parts of the holey fibers 3 as a reflection 52. The part of the ultraviolet light 13 reflected at the metal coating 24 passes through the top face of the glass plate 22 being diffused again thereby to enter partly the end parts of the holey fibers 3 as the reflection 52, since the top face of the glass plate 22 is the scattering surface 23.

As stated above, the end parts of the holey fibers 3 are arranged on the scattering surface 23 of the glass place 22, wherein the scattering surface 23 has a function of reflecting and diffusing the ultraviolet light 13; and the ultraviolet light 13 is radiated from the irradiator 12 provided on the holey fiber 3 side. Therefore, the end parts of the holey fibers 3 are irradiated from the irradiator 12 side and from the glass plate 22 side. The ultraviolet ray curable resin filled in the air holes on the end parts of the holey fibers 3 is cured by the ultraviolet light 13 thus radiated.

The metal coating is provided on the face of the glass plate 22 opposite to the scattering surface 23 thereof to make mirroring function more effectual. Any material that has a high reflectivity with the ultraviolet light 13, aluminum for example, is feasible as the metal coating 24.

In this embodiment, the metal coating 24 absorbs the ultraviolet light 13 passed through the glass plate 22 to generate heat and the heat from the metal coating 24 transfers to the glass plate 22 causing the glass plate 22 to generate heat. The heat of the glass plate 22 warms atmosphere around the top face of the glass plate 22. The end parts of the holey fibers 3 placed in this warmed atmosphere are consequently heated. This means that the glass plate 22, which is the end part working member, heats the end parts of the holey fibers 3 functioning as a heating means for heating the end parts of the holey fibers 3.

In this embodiment as described above, the ultraviolet light 13 radiated from above the end parts of the holey fibers 3 of which air holes are filled with the ultraviolet ray curable resin causes the glass plate 22 to generate heat, which heats the bottom of the end parts of the holey fibers 3. This means that, in this embodiment, one side of the holey fibers 3, which is such a side thereof as faces the irradiator 12, is irradiated with the ultraviolet light 13 and the other side of the holey fibers 3, which is such side thereof as faces the glass plate 22, is heated at the same time.

Further in this embodiment, the other side of the holey fibers 3 is irradiated with the reflection 52 diffusely reflected at the scattering surface 23 on the glass plate 22.

The temperature of the atmosphere, which is warmed by the heat generated from the glass plate 22 caused by the ultraviolet light 13, sharply becomes low in the region beyond 1 mm apart from the top face of the glass plate 22. Therefore, it is preferable in this embodiment to arrange the end parts of the holey fibers 3 above the glass plate 22 so that the distance x from the center of the holey finer 3 to the top face of the glass plate 22 will be 1 mm or less. However, it is undesirable to make the holey fibers 3 touch the top face of the glass plate 22 because such contact will damage the surface of the holey fibers 3. It is also undesirable to make the holey fibers 3 touch the top face of the glass plate 22 further because such contact will prevent the end parts of the holey fibers 3 as a whole from even heating.

In general, a typical diameter of the fiber jacket 35 of the holey finer 3 is 0.25 mm, 0.5 mm, or 0.9 mm. In this embodiment as illustrated in FIG. 2, the optical fiber clamp 26 holds holey fiber 3 by the fiber jacket 35, not directly the holey fiber 3, by pressing the fiber jacket 35 onto the glass plate 22. As illustrated in FIG. 3 therefore, the distance x from the center of the holey fiber 3 to the top face of the glass plate 22 is half the diameter over the fiber jacket of the holey fiber 3. This means that the distance x can be assured to be well within 1 mm even if the arrangement of the holey fibers 3 is not uniform to some extent.

(Bubble-Generation Prevention Effect by Heating Holey Fibers)

An ultraviolet ray curable resin shrinks during its curing by several percent because of polymerization. The diameter of the air hole in a holey finer is in general 10 to 15 μm. On the other hand, the sealing length (a length of the portion of the air hole of the holey fiber filled with ultraviolet ray curable resin to establish sealing) is required to be several millimeters or longer. Therefore, deformation or flow of the ultraviolet ray curable resin is largely constrained by conditions of the inside of the air hole to be sealed. Therefore, bubbles that appear in the conventional sealing method are considered to be vacuum-natured voids generated in a curing-lag portion created by a pulled-apart movement caused by shrinkage of ultraviolet ray curable resin while curing.

The inventors' devoted study has found that elimination of such voids being observed as bubbles demands that the ultraviolet ray curable resin used should show a large plastic deformation or fluidity even under such a state that the resin has been polymerized to certain degree. The study further has found it preferable, to satisfy this demand, that the temperature of the ultraviolet ray curable resin should be high and the time length of irradiation should be long enough to allow the resin to deform and flow. Particularly, the whole of the end parts of the holey fibers should be heated to such a temperature that the ultraviolet ray curable resin used therein will be warmed to a temperature of the order of its glass-transition point. That is because of the feature that heating the whole of the end parts of the holey fibers to a temperature of the order of glass-transition point of the ultraviolet ray curable resin used therein greatly expedite the deformation and flow of the resin. A temperature of the order of glass-transition point means the glass-transition point of the ultraviolet ray curable resin or temperatures of its vicinity. Preferable temperature is a temperature in the range of −10% to +10% of the glass-transition point of the ultraviolet ray curable resin to be used, or a temperature within such a range that any deterioration does not occur in the ultraviolet ray curable resin and within the range of −5% to +5% of the glass-transition point of the ultraviolet ray curable resin. In the case for example that the ultraviolet ray curable resin that fills the end parts of the air holes is the ultraviolet ray curable resin A, of which glass-transition point is 145° C., or the ultraviolet ray curable resin B, of which glass-transition point is 57° C., heating should preferably be applied with a temperature that does not invite any deterioration in the ultraviolet ray curable resin and within 145° C.±5% or 57° C.±5%.

It is preferable to heat at a temperature within such a range that the ultraviolet ray curable resin will not deteriorate.

In this embodiment, the glass plate 22 generates heat by the heat transferred from the metal coating 24 that produces heat absorbing part of the ultraviolet light 13, and the heat from the glass plate 22, which is generating heat, warms the air in the vicinity of the top face of the glass plate 22, and then the warmed air heats the holey fibers 3 arrayed in the warmed air. Therefore, it becomes possible to provide a complete heating of the holey fibers 3 themselves simply by irradiating the ultraviolet light 13.

In a method in which the air holes on the end part of the holey fiber are sealed without heating the holey fiber itself in contrast, the holey fiber itself draws heat from the ultraviolet ray curable resin, of which heat is produced by absorption of ultraviolet light, while irradiation of the ultraviolet light preventing the ultraviolet ray curable resin from its temperature rise since the holey fiber itself stays not warmed as the holey fiber does not absorb ultraviolet light because of its raw material being quartz.

(Bubble-Generation Prevention Effect Provided by Ultraviolet Light Reflection)

The shape of bubbles that appear in the conventional method is awkward, which is different from those shapes that may be observed usually in boiling-bubbles (a round shape and smooth surface). The reason for the bubble shape being awkward is inferred, as can be derived from the above-stated cause of generation of bubbles, that bubbles or voids are created by a load such as tensile stress resulted from shrinkage that appears as the ultraviolet ray curable resin cures. The mechanism therein would be: that polymerizing reaction of the ultraviolet ray curable resin proceeds locally from a spot where the irradiation intensity of the ultraviolet light is high or the resin temperature is high, that this produces a load such as tensile stress in a part where progress of polymerization of the ultraviolet ray curable resin is in a lag because of shrinkage of the cured portion of the ultraviolet ray curable resin, and that the load thus appeared creates bubbles in the cure-lag portion.

This means that creation of bubbles will be accelerated where the distribution of irradiation of the ultraviolet light is not even over the entire ultraviolet ray curable resin in the air holes. Therefore, it is of particular necessity to avoid unevenness of irradiation in sealing the end parts of the holey fibers.

Figure 4A:
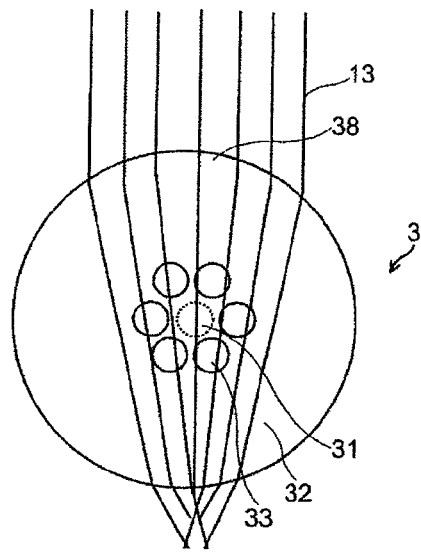
FIGS. 4A to 4C illustrate traveling modes of ultraviolet light within a holey fiber when irradiated with ultraviolet light from its lateral side.
Figure 4B:
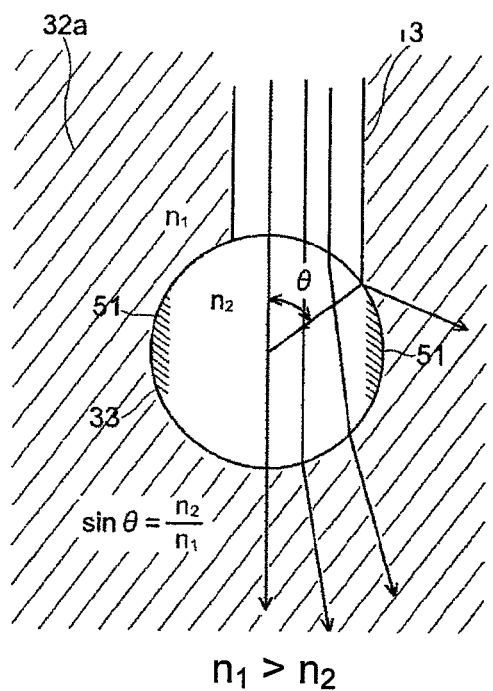
Figure 4C:
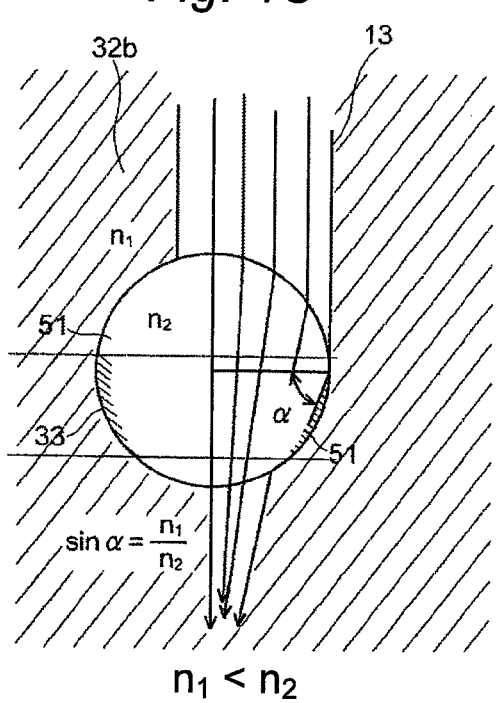
Figure 5A:
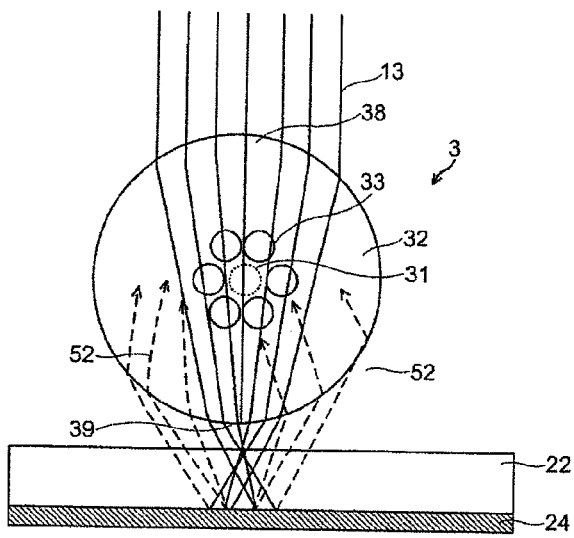
FIGS. 5A to 5C illustrate traveling modes of ultraviolet light radiated over an end part processing unit of an end part processing apparatus of optical fibers pertinent to an embodiment of the present invention.
Figure 5B:
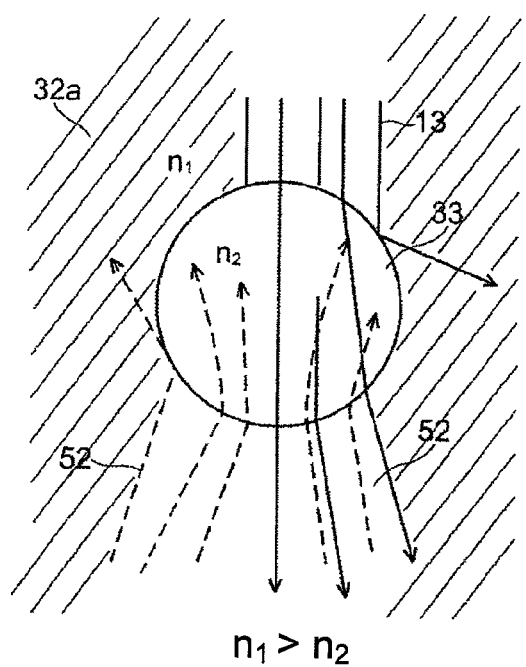
Figure 5C:
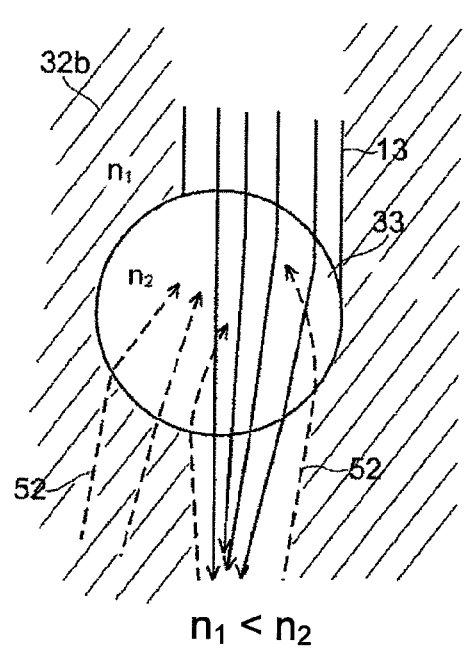

FIGS. 4A to 4C illustrate traveling modes of ultraviolet light within a holey fiber when irradiated with ultraviolet light from its lateral side. FIGS. 5A to 5C illustrate traveling modes of ultraviolet light irradiating an end part processing unit of an end part processing apparatus of optical fibers pertinent to an embodiment of the present invention.

In FIG. 4A, the holey fiber 3 comprised of a core 31 and a cladding 32 having air holes 33 is under irradiation of the ultraviolet light 13. The cladding 32 is formed on the periphery of the core 31 and the air holes 33 are formed within the cladding 32 along the axial direction of the core 31. In FIG. 4A, when the ultraviolet light 13 is radiated from the irradiator that emits ultraviolet light toward the holey fiber 3, such a surface on the holey fiber 3 as is irradiated with the ultraviolet light 13 is defined as an exposure surface 38.

The lateral face of the holey fiber 3 is a curved surface as FIG. 4A illustrates; the radiated ultraviolet light 13 enters inside of the holey fiber 3 with refraction like entering a lens. Inside the holey fiber 3, the ultraviolet light 13 travels to the core 31 of the holey fiber 3 toward a focusing tendency. Therefore, the lighting intensity inside the holey fiber 3 is low on the exposure surface 38 and high on the surface symmetrically opposite to the exposure surface 38 with respect to the core 31.

Unevenness of irradiation due to the refraction of the ultraviolet light 13 occurs likewise inside the air holes 33 filled with the ultraviolet ray curable resin. This is because of the fact that the refractive index n1 of the cladding 32 and the refractive index n2 of the ultraviolet ray curable resin filled in the air holes 33 are not identical. The refractive index of the cured ultraviolet ray curable resin at a wavelength for optical communication is required to be smaller than that of the cladding 32. At the wavelength of the ultraviolet light 13 on irradiation however, the relationship between refractive indices might be inverse to the above-stated relationship and the refractive index of the ultraviolet ray curable resin might differ before and after curing. Therefore, the magnitude relation of refractive indices between the cladding 32 and the ultraviolet ray curable resin filled in the air holes 33 will not be fixed even when the resin has been cured.

FIGS. 4B and 4C illustrate traveling modes of ultraviolet light within air holes. FIG. 4B illustrates the modes where the refractive index n1 of the cladding 32 is larger than the refractive index n2 of the ultraviolet ray curable resin, namely, n1>n2. FIG. 4C illustrates the modes where the refractive index n1 of the cladding 32 is smaller than the refractive index n2 of the ultraviolet ray curable resin, namely, n1<n2.

Corresponding to the total reflection conditions, each mode illustrated in FIGS. 4B and 4C leaves an un-irradiated area 51 of a slight shadow area where the irradiation of the ultraviolet light 13 does not cover. The angles θ and α denote the boundary of the un-irradiated area 51.

The actual incident ultraviolet light 13 has an angular broadening toward the end; therefore, the un-irradiated area 51 might be not a complete black zone such that no ultraviolet light 13 irradiates. However, unevenness of irradiation represented by the un-irradiated area 51 definitely appears somewhere inside the air holes 33. This unevenness of irradiation inside the air holes 33 causes variety of the speed of curing at each portion of the ultraviolet ray curable resin connecting to easy creation of bubbles in the ultraviolet ray curable resin. Once a bubble appears, the bubble triggers further occurrence of unevenness of the irradiation. The unevenness of the irradiation is undesirable not only in that it connects to easy creation of bubbles but also in that it causes irregular internal strain spoiling adhesion strength of the ultraviolet ray curable resin that is in contact with the inner surface of the air holes 33.

In this embodiment as illustrated in FIG. 5, the end part of the holey fiber 3 is irradiated by the ultraviolet light 13 radiated from above the holey fiber 3 and by the reflection 52 from below the holey fiber 3. Therefore, prevention of occurrence of unevenness of the irradiation inside the air holes 33 becomes feasible.

As illustrated in FIG. 5A, the exposure surface 38 of the holey fiber 3 is irradiated with the ultraviolet light 13. The ultraviolet light 13 passed through the holey fiber 3 penetrates the glass plate 22 and is reflected at the metal coating 24 producing the reflection 52. The reflection 52, shown with broken lines, enters the holey fiber 3 from a face 39 thereof opposite to the exposure surface 38 and irradiates the ultraviolet ray curable resin filled in the air holes 33. The irradiation by the reflection 52 entering from the face 39 reduces the degree of unevenness of the irradiation inside the holey fiber 3.

An effect similar to the one stated above is obtainable inside the air holes 33 filled with the ultraviolet ray curable resin. Regardless of the case of n1>n2 or n1<n2 illustrated in FIGS. 5B and 5C, the reflection 52 irradiates such a portion of the ultraviolet ray curable resin filled inside the air holes 33 as has not been fully irradiated with the ultraviolet light 13 through the exposure surface 38. Thereby, appearance of the un-irradiated area 51, which is explanatorily illustrated in FIGS. 4B and 4C, is reduced making prevention of unevenness of the irradiation possible.

The prevention of occurrence of unevenness in the irradiation distribution makes it practicable to unify the curing speed of each part of the ultraviolet ray curable resin. Because of this feature, the appearance of bubbles in the ultraviolet ray curable resin becomes hard to occur. Further, this feature reduces internal strain of the ultraviolet ray curable resin making it practicable to prevent spoiling adhesion strength of the ultraviolet ray curable resin that is in contact with the inner surface of the air holes 33.

Figure 6A:
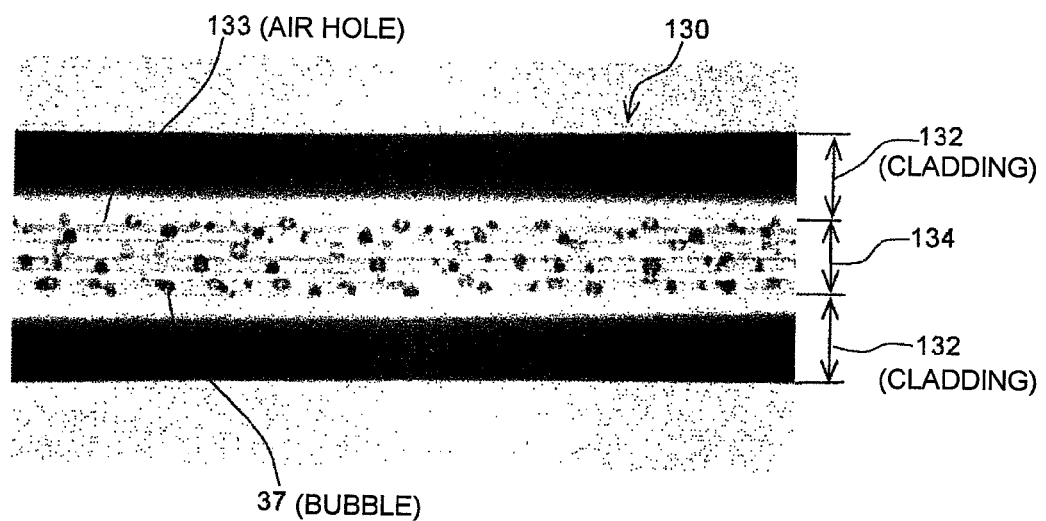
FIG. 6A is an electron micrograph that shows the cross section of a sealed portion formed by a conventional method.
Figure 6B:
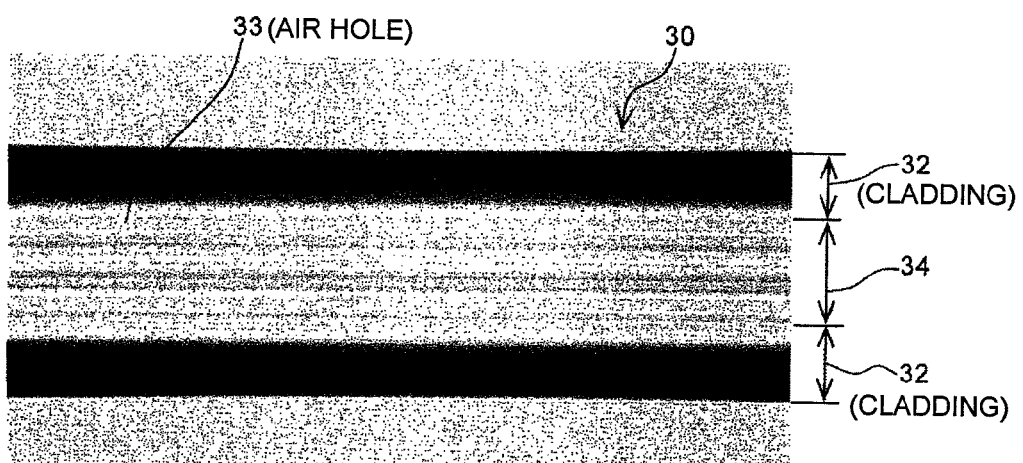
FIG. 6B is an electron micrograph that shows the cross section of a sealed portion formed by the method defined in an embodiment of the present invention.

FIG. 6 is an electron micrograph that shows the cross section of a sealed portion formed by sealing the end portion of the air hole of a holey fiber with ultraviolet ray curable resin. FIG. 6A is an electron micrograph that shows the cross section of a sealed portion formed by a conventional method. FIG. 6B is an electron micrograph that shows the cross section of a sealed portion formed by the method defined in an embodiment of the present invention. The length of the sealed portion (sealing length) was approximately 6 mm.

As FIG. 6A shows, in a holey fiber 130 that has a sealed portion at its end part provided by a conventional processing method, it is evidently found that many bubbles 37 appear in a longitudinal direction inside air holes 133 that are filled with ultraviolet ray curable resin, i.e., the sealed portion in a region 134 including air holes 133 formed inside a cladding 132. In contrast to this as shown in FIG. 6B in the holey fiber 30 that has a sealed portion at its end provided by a method described in the embodiment, it is evidently known that none of bubbles like those bubbles 37 as shown in FIG. 6A exist throughout the longitudinal direction inside the air holes 33 that are filled with ultraviolet ray curable resin, i.e., the sealed portion in a region 34 including air holes 33 formed inside a cladding 32.

In this embodiment as stated above, heating the holey fiber 3 in irradiation of the ultraviolet light 13 rises the temperature of the ultraviolet ray curable resin filled in the air holes 33 giving plastic fluidity thereto even after polymerization has significantly proceeded. Therefore, it becomes possible to prevent appearance of bubbles by allowing the ultraviolet ray curable resin to deform so that the vacuum-natured bubbles will be filled.

Further, reflecting the ultraviolet light 13 with the metal coating 24 arranged under the holey fiber 3 allows the holey fiber 3 to be irradiated from both the exposure surface 38 and the face 39 that is opposite to the exposure surface 38. Thereby, occurrence of unevenness of irradiation inside the air holes 33 is prevented making the curing speed of the ultraviolet ray curing resin uniform with the appearance of bubbles in the ultraviolet ray curable resin eliminated.

A Modification Example of this Embodiment

To this point, the explanation of this embodiment has been made based on that the glass plate 22 is quartz glass. However, multicomponent glass may be used for the glass plate 22 as a modification example of embodiments of the present invention.

Where the glass plate 22 uses multicomponent glass, lessening the absorption of the ultraviolet light 13 into the ultraviolet ray curable resin inside the holey fiber 3 is reduced because the range of absorption wavelengths of multicomponent glass is shorter than 365 nm.

Figure 7:
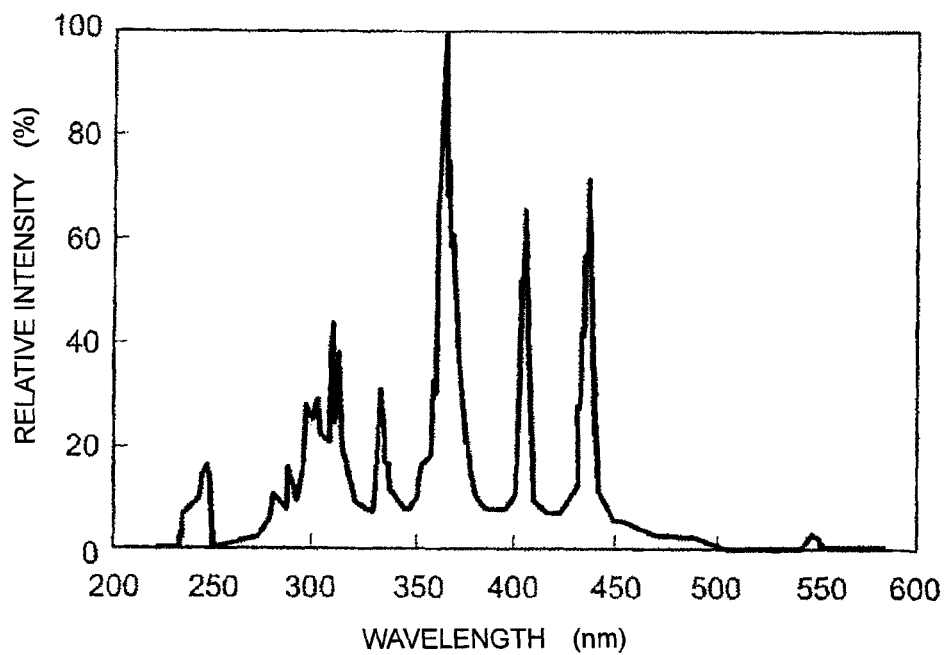
FIG. 7 shows an emission spectrum of an ultra-high pressure mercury lamp.

On the other hand, most of ultraviolet ray curable resin is designed to be photosensitive to intense spectrum around 365 nm such that ultra-high pressure mercury lamps or mercury xenon lamps emits, as an emission spectrum of ultra-high pressure mercury lamp is typically shown in FIG. 7. There are many types of multicomponent glass; every glass has different absorption edge (an end wavelength from which absorption wave length range begins). However, multicomponent glass shows less absorption at around 365 nm and shows certain absorption in the wavelengths shorter than that. Therefore, multicomponent glass is able to reduce above-stated effects.

Figure 8:
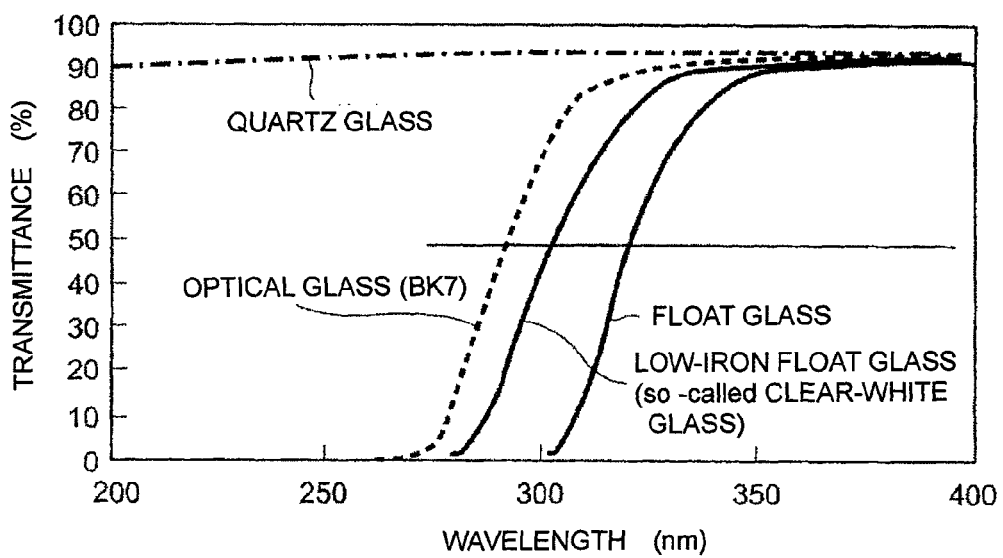
FIG. 8 shows transparent wavelength properties of quartz glass and various kinds of multicomponent glasses.

FIG. 8 shows transparent wavelength properties of quartz glass and typical multicomponent glass. Each of values in the graph includes reflection losses that occur at both sides of a glass plate, which means that even a material of non-absorbing nature will not reach a transparency of 100%.

Quartz glass, of which property is represented with dot-dash line in FIG. 8, does not generate heat because its transmittance is high irrespective of wavelength. In contrast to this, the absorption edges of optical glass, low-ion float glass (so-called clear-white glass), and float glass vary in this order from shorter wavelength to longer. Accordingly, soda-lime glass has the highest heat-generating efficiency in these glasses but on the contrary irradiation light for ultraviolet curing is lessened as the consequence.

As the transparent wavelength properties shown in FIG. 8 teach, use of quartz glass for the glass plate 22 is preferable where such an ultraviolet ray curable resin as cures at wavelengths shorter than 300 nm is used. When quartz glass is used, it is preferred to provide the metal coating on the bottom face of the quarts glass in order that the heat generation of the metal coating 24 may heat the quartz glass, because the quartz glass does not generate heat. Although the quartz glass itself does not generate heat, the metal coating generates heat absorbing about 10% of ultraviolet light. Therefore, temperature control is practicable by determining the proper thickness of the glass plate 22 and by adjusting the degree of heat insulation of the back face thereof. If degree of heating the quartz glass is not enough, it may be an alternative to additionally heat the metal coating with a heater so that increased heat will be transferred from the metal coating giving enough heating to the quartz glass. Even where the wavelength for curing is longer than 300 nm, it is still preferable to use quartz glass and metal coating as long as the proper heating of the quartz glass is assured.

As an alternative in the case of heating being not enough, use of multicomponent glass is effective. When thickness of the glass plate 22 is increased, light absorption increases but temperature does not always rise because volume of the glass plate 22 also increases. Further, the temperature of the glass plate 22 is largely dependent on the heat dissipation from the bottom face of the glass plate 22. In consideration of these aspects, providing the seating (seating member) 25 as illustrated in FIG. 2 permits an efficient heating since such arrangement gives a heat insulation effect. The necessity of the heat insulation is a requirement common to above-stated case of the quartz glass.

The heat insulation may be given by providing air space between the glass plate 22 and the seating 25 other than selecting suitable material for the seating 25. Thus, temperature can be regulated by selecting material and thickness of the glass plate 22 and by choosing material and structure of the seating 25.

In this embodiment, appearance of bubbles can be prevented even if the reflection 52 from beneath the holey fiber 3 (from the glass plate 22 side) is weak where heating the holey fiber 3 is enough. However, excessive heating should be avoided since such over-heating may invite degradation of ultraviolet ray curable resin.

From this point of view, elimination of unevenness of irradiation should preferably be performed not by heating only but by controlled irradiation of ultraviolet light. Particularly in the case where the irradiation of the reflection 52 from the bottom is not much promising (when intensity of the reflection 52 is weak for example), the ultraviolet light 13 to be radiated from the irradiator 12 should be made to contain a variety of angular components.

Figure 9A:
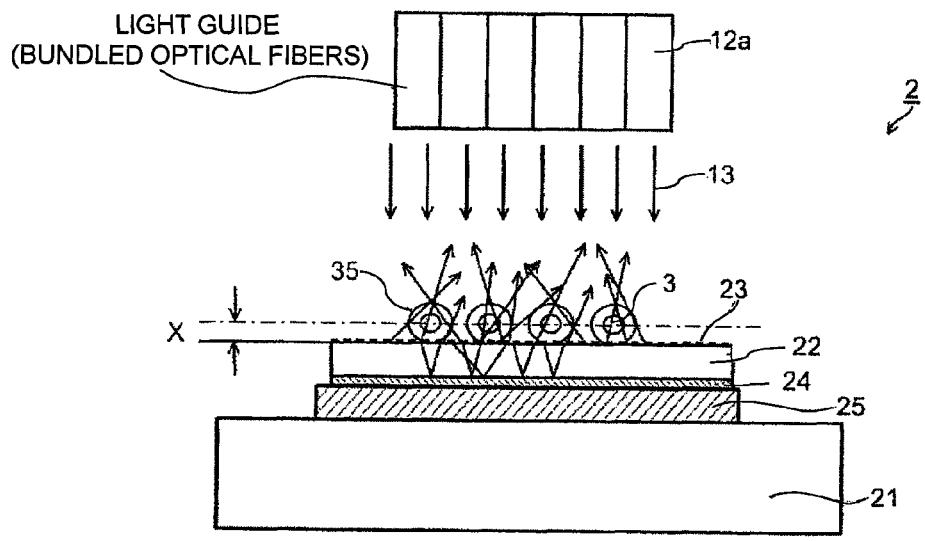
FIG. 9 illustrates a variation of an end part processing unit of an end part processing apparatus of optical fibers pertinent to an embodiment of the present invention.
Figure 9B:
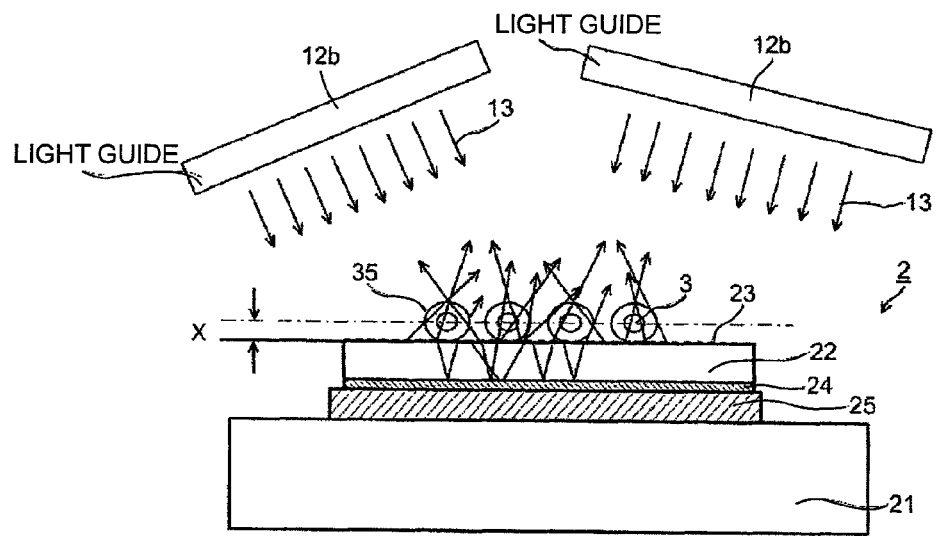

For example, it may be practicable to output the ultraviolet light 13 using an irradiator 12a comprised of a light guide, which is a bundled multiple number of optical fibers, as illustrated in FIG. 9A, or instead, to radiate the ultraviolet light 13 using an irradiation unit 12b-12b comprised of a bifurcated style light guide from two directions as illustrated in FIG. 9B.

In particular, the ultraviolet light 13 outputted from the light guide comprised of a bundled multiple number of optical fibers as illustrated in FIG. 9A is especially effective when the number of the end parts of the holey fibers to be irradiated collectively is small since the ultraviolet light 13 emitted in such manner has angular components dependent on the numerical aperture (NA) of each optical fiber in the bundle.

Embodiment 2

Figure 10:
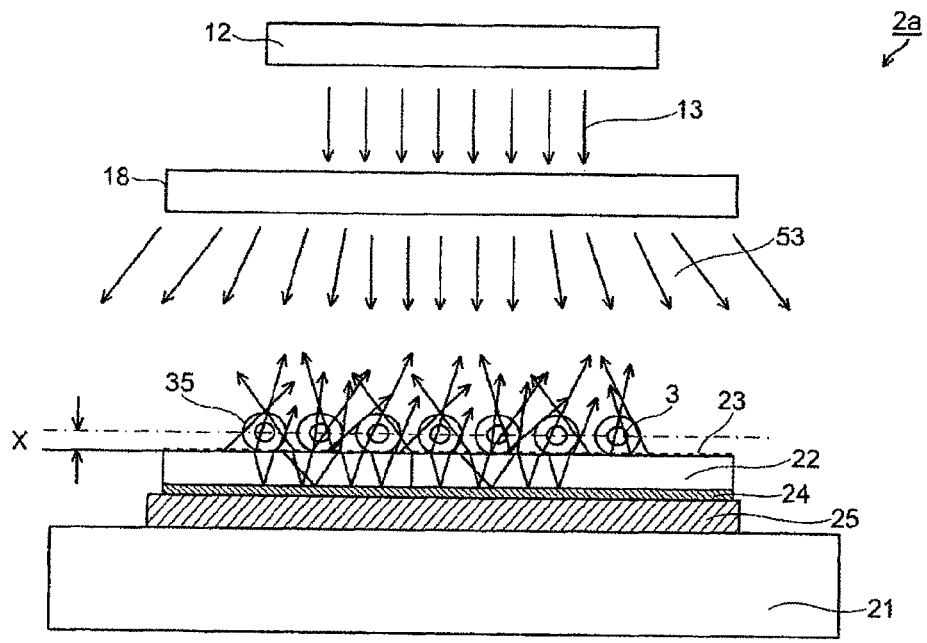
FIG. 10 is an enlarged view on an end part processing unit of an end part processing apparatus of optical fibers pertinent to a second embodiment of the present invention.

FIG. 10 illustrates an end part processing unit pertinent to a second embodiment of the present invention. An end part processing unit 2a illustrated in FIG. 10 is different from the end part processing unit 2 illustrated in FIGS. 2 and 3 only in that the number of the holey fibers 3 to be arranged in an array is different and that a transmissive diffuser plate 18 is provided. Therefore, explanation about constitutional members common to those illustrated in such as FIG. 2 is omitted.

In the end part processing unit 2a illustrated in FIG. 10, the number of the holey fibers 3 to be irradiated with the ultraviolet light 13 is larger than that in the end part processing unit 2 illustrated in such as FIG. 2. In this case, the irradiation coverage angle of the ultraviolet light 13 radiated from the irradiator 12 may be enlarged using an optical system with lenses. If the enlarging of the irradiation coverage angle of the ultraviolet light 13 radiated from the irradiator 12 with the optical system with lenses is small or not sufficient, it is preferable to use the transmissive diffuser plate 18 as illustrated in FIG. 10 for example.

The transmissive diffuser plate 18 is located, for example, at such position as is above the holey fibers 3 and beneath the irradiator (downward irradiation lens unit) 12.

In this embodiment, the ultraviolet light 13 passes through the transmissive diffuser plate 18 and takes a form of a diffusive light 53 to irradiate the holey fibers 3. Thereby, the end parts of the holey fibers 3 are irradiated with the diffusive light 53 that has variety of angular irradiation spreads with respect to the direction from the irradiator 12 toward the glass plate 22. Thus, the unevenness of the irradiation can be further reduced.

It is more effective in this embodiment to apply the reflection from the bottom by providing the metal coating 24 as illustrated in FIG. 10. The transmissive diffuser plate 18 may be selected from variety considering properties of the ultraviolet ray curable resin as seen in the first embodiment. When avoiding a loss of ultraviolet light due to absorption is desired for example, it is preferable to use a diffuser plate of which raw materials is quartz glass.

Embodiment 3

Figure 11:
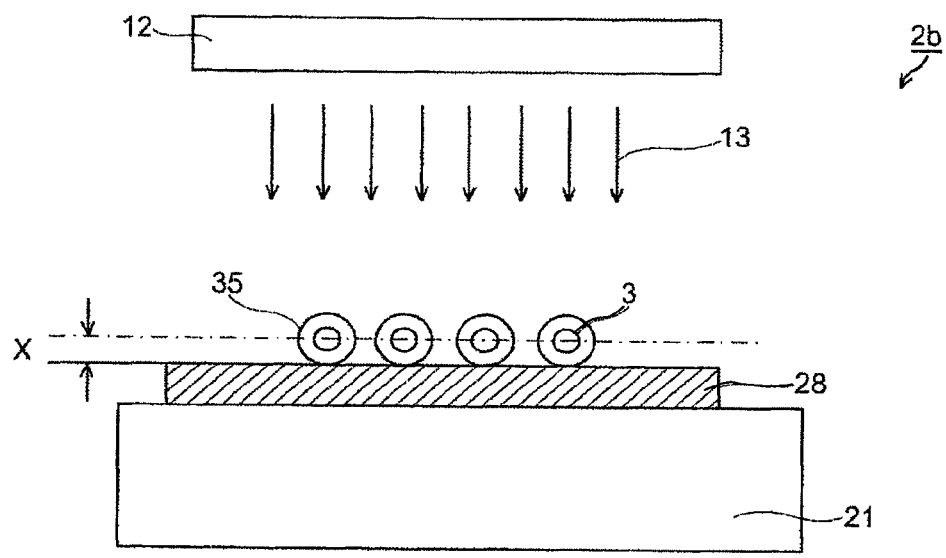
FIG. 11 is an enlarged view on an end part processing unit of an end part processing apparatus of optical fibers pertinent to a third embodiment of the present invention.

FIG. 11 illustrates an end part processing unit pertinent to a third embodiment of the present invention. An end part processing unit 2b illustrated in FIG. 11 differs from the end part processing unit 2 in that a metal plate (end part working member) 28 is provided instead of the glass plate. It should be noted that explanation about constitutional members correspondingly common to those in the end part working unit 2 are omitted, as well as in the explanation about the second embodiment.

In the end part processing unit 2b illustrated in FIG. 11, the metal plate 28 is arranged on the supporting base 21 and the holey fibers 3 are placed above the metal plate 28 closely thereto within such an extent that no touching will occur.

In this embodiment, it is preferable to use aluminum or stainless steel for the metal plate 28 from view points of reflection or absorption properties, easiness in maintenance, and cost reduction.

Figure 12:
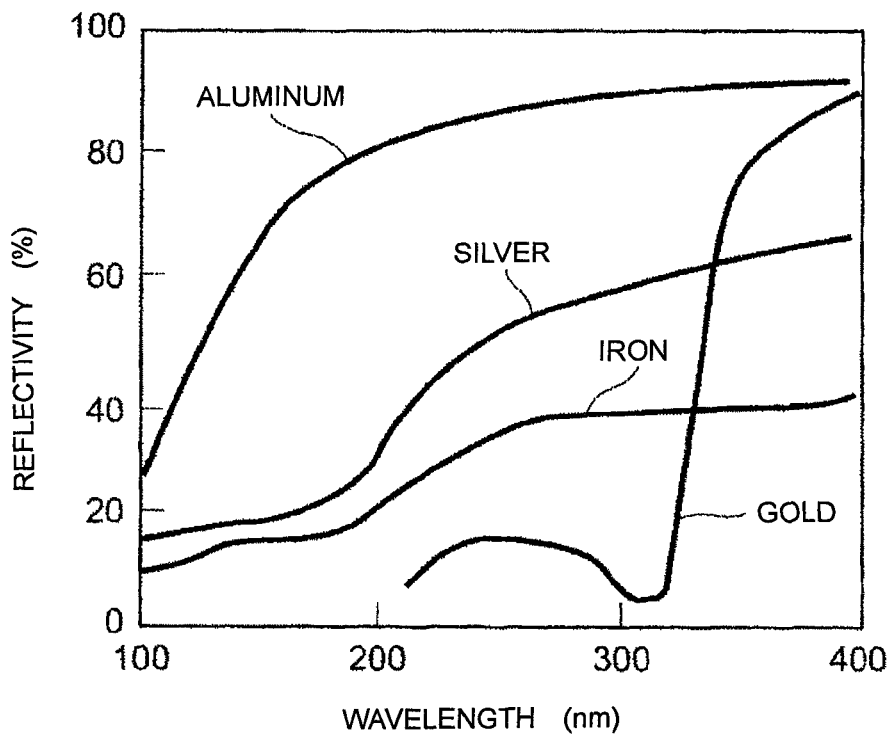
FIG. 12 shows spectral reflectivity of various metals.
Figure 13:
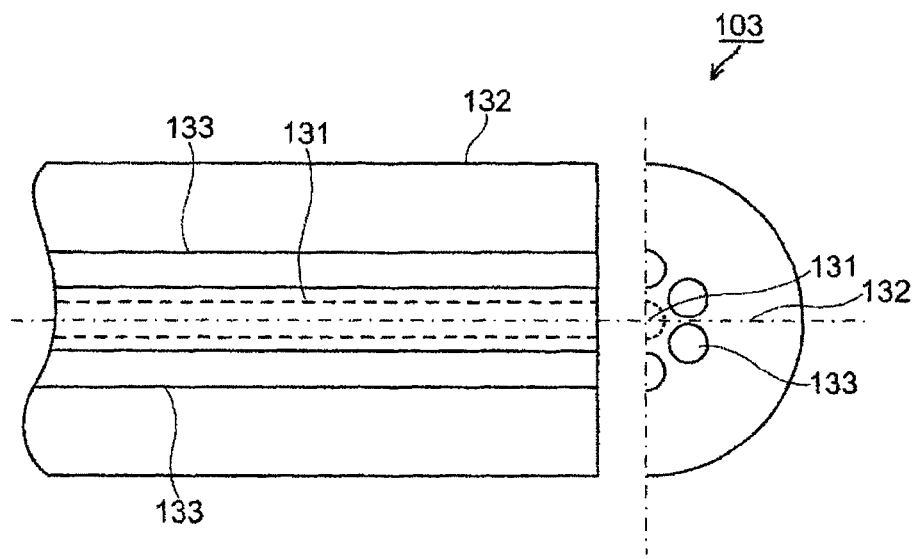
FIG. 13 illustrates a construction of a conventional holey fiber.

FIG. 12 shows examples of spectral reflectivity of typical metals that show larger reflection in ultraviolet range. Gold shows high reflectivity at a wavelength of 365 nm; but low at about 300 nm or shorter, which implies absorption is larger. This means that gold is suitable for application to an ultraviolet ray curable resin that is photosensitive at wavelengths about 365 nm.

Aluminum shows high reflectivity at wavelengths over entire ultraviolet light band but generates heat since it absorbs about 10% of ultraviolet light. Therefore, aluminum is applicable to various ultraviolet ray curable resin having different photosensitive wavelengths by regulating heat insulation properties properly.

Silver and iron show about 40 to 60% of reflectivity, of which wavelength dependency is gentle. Therefore, they are useful in that heat generation due to absorption occurs, although the reflectivity of contributable component in ultraviolet light to curing is not very good. As a practical use, stainless steel is preferable material more than silver or iron because stainless steel has properties close to that of iron and has no anxiety about property change due to rust.

Thus, the temperature of the holey fibers 3 is controllable by using a plate or a metal foil comprised of above-stated metal or using a metal plate or a foil comprised preferably of stainless steel with a properly designed degree of heat insulation and heat radiation. When considering heat insulation or heat radiation, it is preferable to provide the seating 25 between the metal plate 28 and the supporting base 21 for example, as used in the end part working unit 2.

The surface of the metal plate 28 should preferably have a roughened scattering surface formed in a manner such as mat finish or hair line finish so that the ultraviolet light will be reflected diffusely thereat in order to irradiate the end parts of holey fibers 3 from various directions. Arranging the transmissive diffuser plate 18 shown in the second embodiment is also feasible.

Further to the above in this embodiment, it is practicable to use the metal plate 28 as a means for heating the end part of the holey fiber 3 similarly to the glass plate 22 illustrated in FIGS. 2 and 3. In this usage, the distance x from the center of the holey fiber 3 to the surface of the metal plate 28 should preferably be 1 mm or less.

As has been stated above, the ultraviolet ray curable resin to be used in such modes of embodiments as are described in the first to the third embodiments should preferably be transparent so as not to cause absorption loss of light. The refractive index of the ultraviolet ray curable resin before curing should preferably have such a property that the room temperature refraction index thereof at wavelengths of communication lights after the resin has cured freely with no constraint is approximately the same as or smaller than that of the core of the optical fiber. The reason for this is as follows: Because of reduced unevenness of irradiation and creation of bubbles being prevented, the lowering of refractive index proceeds homogeneously in the ultraviolet ray curable resin in the air hole as curing develops with constrained shrinkage maintaining such a state that the refractive index of the cured ultraviolet ray curable resin is lower than that of the cladding. No loss increase will occur under usual low temperature conditions. Naturally, use of a resin having much further low refractive index is preferable since such resin makes the refractive index inside the air hole become much lower.

Further, it is necessary for a stable propagation of light that the cured ultraviolet ray curable resin should have a refractive index at communication wavelengths equal to or smaller than that of cladding. The reason for this is as follows: If the refractive index of a cured ultraviolet ray curable resin is made equal to or higher than that of the cladding, the air hole becomes a pseudo-core that is the same as the core of an optical fiber causing leakage of light into the air hole portion from the core of the optical fiber due to the light coupling phenomenon inviting a large transmission loss.

In the above-stated modes of embodiments, it is described that the end part of the holey fiber is heated using the end part processing member (the glass plate 22 and metal plate 28) as a means for heating the end part of the holey fiber. However, the method of heating is not limited to these practices. For example, the ultraviolet ray curable resin may be cured in the manner wherein the end parts of the holey fibers are directly heated using a heating means such as a heater provided on the end part processing unit separately from the end part processing member so that the ultraviolet ray curable resin thereof will reach approximately its glass transition point. That is, the ultraviolet ray curable resin filled in the end portion of the air hole is irradiated with the ultraviolet light and its reflection to be cured with all the end parts of the holey fibers heated approximately to the glass transition point of the ultraviolet ray curable resin used.

The invention claimed is:

1. An end part processing method of an optical fiber, the optical fiber comprising a core, and a cladding formed around said core, said cladding having a refractive index lower than a refractive index of said core and a plurality of air holes formed therein along the axis of said core, wherein the end part process of said optical fiber is to form sealed portions on the ends of said air holes by sealing them with ultraviolet ray curable resin, said method comprising the steps of:
    filling said end parts of said air holes of said optical fiber with said ultraviolet ray curable resin;
    arranging said end part of said optical fiber filled with said ultraviolet ray curable resin on an end part processing member, which is equipped in an end part processing unit, in such a manner that said end part of said optical fiber does not touch said end part processing member, wherein said end part processing member has ultraviolet light reflecting nature; and
    curing said ultraviolet ray curable resin filled inside said end parts of said air holes to form said sealed portion by irradiating said end part of said optical fiber with ultraviolet light emitted from an irradiator provided in the position opposite to said end part processing member across the arrangement of said end part of said optical fiber,
    wherein said end part of said optical fiber is irradiated with ultraviolet light emitted from said irradiator and with the reflection of said emitted ultraviolet light reflected off said end part processing member with said end part of said optical fiber heated by said end part processing member that is made to generate heat by absorbing ultraviolet light.

2. The end part processing method of an optical fiber according to claim 1, wherein said end part processing member irradiates said end part of said air hole with diffuse reflection of said emitted ultraviolet light reflected off a scattering surface formed on the face thereof on which face said end part of said optical fiber is to be arranged.

3. The end part processing method of an optical fiber according to claim 1,
    wherein said end part processing member is comprised of a glass plate and a metal coating provided on the other face of said glass plate opposite to the face thereof on which said optical fiber is to be arranged, and
    wherein said end part of said optical fiber is heated by said glass plate that is made to generate heat by the heat transferred from said metal coating that is made to generate heat by absorbing ultraviolet, said ultraviolet light penetrating said glass plate.

4. The end part processing method of an optical fiber according to claim 2,
    wherein said end part processing member is comprised of a glass plate and a metal coating provided on the other face of said glass plate opposite to the face thereof on which said optical fiber is to be arranged, and
    wherein said end part of said optical fiber is heated by said glass plate that is made to generate heat by the heat transferred from said metal coating that is made to generate heat by absorbing ultraviolet light, said ultraviolet light penetrating said glass plate.

5. The end part processing method of an optical fiber according to claim 1,
    wherein said end part processing member is comprised of a metal plate, and
    wherein said end part of said optical fiber is heated by said metal plate that is made to generate heat by absorbing ultraviolet light.

6. The end part processing method of an optical fiber according to claim 2,
    wherein said end part processing member is comprised of a metal plate, and
    wherein said end part of said optical fiber is heated by said metal plate that is made to generate heat by absorbing ultraviolet light.

7. The end part processing method of an optical fiber according to claim 1,
    wherein said end part of said optical fiber is arranged on said end part processing member so that the distance from the surface of said end part processing member to the center of said optical fiber will be within 1 mm, and
    wherein the center of said optical fiber is located at a point within the circumference of said optical fiber.

8. An end part processing apparatus of an optical fiber that is comprised of a core and a cladding formed around said core, said cladding having a refractive index lower than that of said core and a plurality of air holes formed therein along the axis of said core, wherein said end part process of an optical fiber is to form sealed portions on said end parts of said air holes by sealing them with ultraviolet ray curable resin, said apparatus comprising
    an ultraviolet light irradiation unit having an irradiator that irradiates said end part of said optical fiber with ultraviolet light; and
    an end part processing unit, on which said end part of said optical fiber is arranged being made to face said irradiator, provided in a position opposite to said irradiator across said end part of said optical fiber to process said end part of said optical fiber so arranged thereon with ultraviolet light from said irradiator,
    wherein said end part processing unit having said end part of said optical fiber arranged thereon is comprised of an end part processing member, and
    wherein said end part processing member generated heat by ultraviolet light emitted from said irradiator, said ultraviolet light penetrating said end part of said optical fiber, heats said end part of said optical fiber thereby, and reflects part of said ultraviolet light from said irradiator to irradiate said end part of said optical fiber with such reflection.

9. The end part processing apparatus of an optical fiber according to claim 8,
    wherein said end part processing member has a scattering surface on the face thereof on which face said end part of said optical fiber is to be arranged, and
    wherein said scattering surface makes diffuse reflection of ultraviolet light.

10. The end part processing apparatus of an optical fiber according to claim 8, wherein said end part processing member is comprised of a glass plate or a metal plate.

11. The end part processing apparatus of an optical fiber according to claim 9, wherein said end part processing member is comprised of a glass plate or a metal plate.

12. The end part processing apparatus of an optical fiber according to claim 10, wherein said glass plate has a metal coating on the other face thereof opposite to the face on which said optical fiber is arranged, wherein said metal coating absorbs part of ultraviolet light, said ultraviolet light penetrating said glass plate, generates heat to heat said glass plate, and reflects said ultraviolet light that penetrated said glass plate.

13. The end part processing apparatus of an optical fiber according to claim 11,
   wherein said glass plate has a metal coating on the other face thereof opposite to the face on which said optical fiber is arranged, and
   wherein said metal coating absorbs part of ultraviolet light, said ultraviolet light penetrating said glass plate, generates heat to heat said glass plate, and reflects said ultraviolet light that penetrated said glass plate.

14. The end part processing apparatus of an optical fiber according to claim 8, wherein said end part processing apparatus of an optical fiber is further comprised of a height adjusting table that regulates the distance between said end part processing unit and said irradiator by moving said end part processing unit vertically.

15. An optical fiber comprising
   a core; and
   a cladding formed around said core, said cladding having a refractive index lower than that of said core and a plurality of air holes formed therein along the axis of said core,
   wherein end parts of said air holes have sealed portions formed by curing the ultraviolet ray curable resin filled inside said end parts of said air holes by irradiation of ultraviolet light and its reflection with said end parts of said air holes being heated.

* * * * *